US011190561B2

(12) United States Patent
Ingale et al.

(10) Patent No.: US 11,190,561 B2
(45) Date of Patent: *Nov. 30, 2021

(54) VIRTUAL COMPUTING SYSTEM PROVIDING LOCAL SCREEN SHARING FROM HOSTED COLLABORATION APPLICATIONS AND RELATED METHODS

(71) Applicant: CITRIX SYSTEMS, INC., Fort Lauderdale, FL (US)

(72) Inventors: Mukund Ingale, Pompano Beach, FL (US); Jacob Jared Summers, Coral Springs, FL (US); Georgy Momchilov, Parkland, FL (US); Christopher M. Fleck, Hillsboro Beach, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,417

(22) Filed: Jan. 24, 2020

(65) Prior Publication Data

US 2020/0162525 A1 May 21, 2020

Related U.S. Application Data

(63) Continuation of application No. 15/880,938, filed on Jan. 26, 2018, now Pat. No. 10,581,939.

(51) Int. Cl.
*H04L 29/06* (2006.01)
*H04L 29/08* (2006.01)
*G06F 9/451* (2018.01)

(52) U.S. Cl.
CPC .......... *H04L 65/403* (2013.01); *G06F 9/452* (2018.02); *H04L 65/1069* (2013.01); *H04L 67/1095* (2013.01); *H04L 67/42* (2013.01)

(58) Field of Classification Search
CPC ..... H04L 67/1097; G06F 9/467; G06F 3/0605
See application file for complete search history.

(56) References Cited

U.S. PATENT DOCUMENTS 7,290,061 B2 10/2007 Lentini et al.
8,131,816 B2 3/2012 Robinson et al.
(Continued)

FOREIGN PATENT DOCUMENTS

WO WO2009143294 11/2009

*Primary Examiner* — Nicholas R Taylor
*Assistant Examiner* — Sanjoy Roy
(74) *Attorney, Agent, or Firm* — Allen, Dyer, Doppelt + Gilchrist, PA

(57) ABSTRACT

A computing system may include a first client computing device configured to locally generate a first local graphics surface, and a second client computing device configured to locally generate a second local graphics surface. A collaboration cloud computing service may cooperate with the first and second client devices to capture the first graphics surface from the first client device and share the first graphics surface from the first client device within the second graphics surface of the second client device, determine a media cloud source and playback control data associated with a video to be displayed in the first graphics surface of the first client device, and cause the second client computing device to independently stream the video from the media cloud source and play the video within the shared first graphics surface synchronously with playback of the video at the first client device based upon the playback control data.

15 Claims, 12 Drawing Sheets

(56) References Cited

U.S. PATENT DOCUMENTS

| | | |
|---|---|---|
| 2006/0002315 A1 | 1/2006 | Theurer et al. |
| 2006/0031779 A1 | 2/2006 | Theurer et al. |
| 2006/0168533 A1 | 7/2006 | Yip et al. |
| 2006/0271877 A1 | 11/2006 | Theurer |
| 2009/0106357 A1* | 4/2009 | Igelman ............... H04L 65/608 709/203 |
| 2010/0262925 A1 | 10/2010 | Liu et al. |
| 2010/0299436 A1 | 11/2010 | Khalid et al. |
| 2010/0332298 A1* | 12/2010 | Issa ................... H04N 21/8456 705/14.4 |
| 2011/0276900 A1 | 11/2011 | Khan et al. |
| 2012/0042252 A1* | 2/2012 | Neerudu ............... G06F 3/1454 715/733 |
| 2012/0317485 A1* | 12/2012 | Ding .................... G06F 3/1462 715/719 |
| 2014/0025740 A1 | 1/2014 | Jaudon et al. |
| 2014/0215334 A1* | 7/2014 | Garmark ................ H04L 65/60 715/716 |
| 2014/0365923 A1 | 12/2014 | Lee et al. |
| 2015/0009222 A1* | 1/2015 | Diard ................... A63F 13/335 345/505 |
| 2015/0244812 A1* | 8/2015 | Brunson ................ G06F 9/452 709/203 |
| 2015/0244814 A1 | 8/2015 | Khalatian et al. |
| 2015/0346931 A1 | 12/2015 | Moran et al. |
| 2015/0356773 A1* | 12/2015 | Kumar .................... G09G 5/14 345/520 |
| 2016/0246787 A1 | 8/2016 | Zhang |

* cited by examiner ns and Related Methods

VIRTUAL COMPUTING SYSTEM PROVIDING LOCAL SCREEN SHARING FROM HOSTED COLLABORATION APPLICATIONS AND RELATED METHODS

RELATED APPLICATIONS

This application is a continuation of U.S. application Ser. No. 15/880,938 filed Jan. 26, 2018, which is hereby incorporated herein in its entirety by reference.

TECHNICAL FIELD

This application generally relates to computer networks, and more particularly to screen sharing between different client devices through a Virtual Desktop Infrastructure (VDI).

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

SUMMARY

A computing system may include a first client computing device configured to locally generate a first local graphics surface, and a second client computing device configured to locally generate a second local graphics surface. A collaboration cloud computing service may cooperate with the first and second client computing devices to capture the first graphics surface from the first client computing device and share the first graphics surface from the first client computing device within the second graphics surface of the second client computing device, determine a media cloud source and playback control data associated with a video to be displayed in the first graphics surface of the first client computing device, and cause the second client computing device to independently stream the video from the media cloud source and play the video within the shared first graphics surface synchronously with playback of the video at the first client computing device based upon the playback control data.

In an example embodiment, the first client computing device may run a first collaboration application configured to determine an address associated with the media cloud source and send the address to the collaboration cloud computing device. For example, the address may comprise a uniform resource locator (URL). Furthermore, the first client computing device may run a first collaboration application configured to determine the playback control data and send the playback control data to the collaboration cloud computing device. Additionally, the second client computing device may run a second collaboration application, and the collaboration cloud computing service may cooperate with the second collaboration application at the second client computing device to share the first local graphics surface within the second local graphics surface of the second client computing device.

The first client computing device may be further configured to share with the collaboration cloud computing service a location to display the first graphics surface within the second local graphics surface of the second client computing device, for example. By way of example, the playback control data may comprise at least one of a play command, stop command, pause command, seek command, video position, video visible region, audio volume, and balance. In an example configuration, the first local graphics surface of the first client computing device may comprise at least one of a monitor surface of the first client computing device and a local application window of the first client computing device.

A related method may include, at a collaboration cloud computing service, capturing a first graphics surface from a first client computing device and sharing the first graphics surface from the first client computing device within a second graphics surface of a second client computing device, and determining a media cloud source and playback control data associated with a video to be displayed in the first graphics surface of the first client computing device. The method may further include, at the collaboration cloud computing service, causing the second client computing device to independently stream the video from the media cloud source and play the video within the shared first graphics surface synchronously with playback of the video at the first client computing device based upon the playback control data.

A related non-transitory computer-readable medium is also provided having computer-executable instructions for causing a cloud computing device to perform steps which may include capturing a first graphics surface from a first client computing device and sharing the first graphics surface from the first client computing device within a second graphics surface of a second client computing device, and determining a media cloud source and playback control data associated with a video to be displayed in the first graphics surface of the first client computing device. The steps may further include causing the second client computing device to independently stream the video from the media cloud source and play the video within the shared first graphics surface synchronously with playback of the video at the first client computing device based upon the playback control data.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
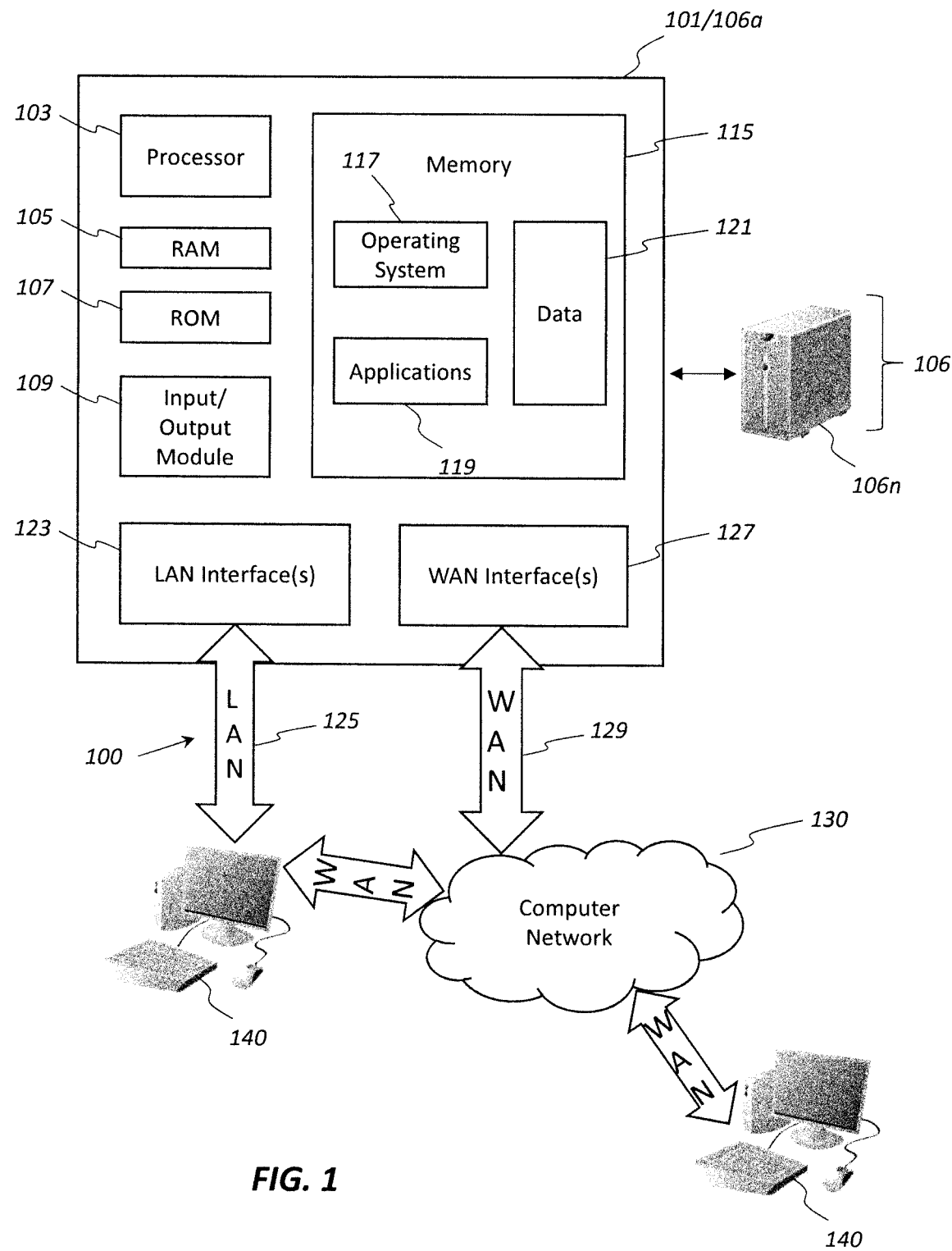
FIG. 1 is a schematic block diagram of an example operating environment in which various aspects of the disclosure may be implemented.

FIG. 1 illustrates an example block diagram of a generic computing device, which in the illustrated example is a computer server 106a, in an example computing environment 100. According to one or more aspects, the server 106a may be a single-server or multi-server desktop virtualization system (e.g., a cloud system) configured to provide virtual machines for client access devices. The server 106a illustratively includes a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling the server 106a to perform various functions. For example, memory 115 may store software used by the server 106a, such as an operating system 117, application programs 119, and an associated database 121. Alternatively, some or all of the computer executable instructions for the server 106a may be embodied in hardware or firmware (not shown).

The server 106a may operate in a networked environment supporting connections to one or more remote computers, such as terminals 140 (also referred to as client or user devices). The terminals 140 may be personal computers or servers that include many or all of the elements described above with respect to the server 106a. The network connections depicted in FIG. 1 include a local area network (LAN) 125 and a wide area network (WAN) 129, but may also include other networks. When used in a LAN networking environment, the server 106a may be connected to the LAN 125 through a network interface or adapter 123. When used in a WAN networking environment, the server 106a may include a modem 127 or other network interface for establishing communications over the WAN 129, such as computer network 130 (e.g., the Internet). It will be appreciated that the network connections shown are illustrative and other means of establishing a communications link between the computers may be used.

The generic computing device and/or terminals 140 may also be mobile terminals (e.g., mobile phones, smartphones, PDAs, notebooks, etc.) including various other components, such as a battery, speaker, and antennas (not shown) in some embodiments.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over Internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106a that receives requests from a client machine 140, forwards the request to a second server 106n, and responds to the request generated by the client machine 140 with a response from the second server 106*n*. The first server 106*a* can acquire an enumeration of applications available to the client machine 140 as well as address information associated with an application server 106 hosting an application identified within the enumeration of applications. The first server 106*a* can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
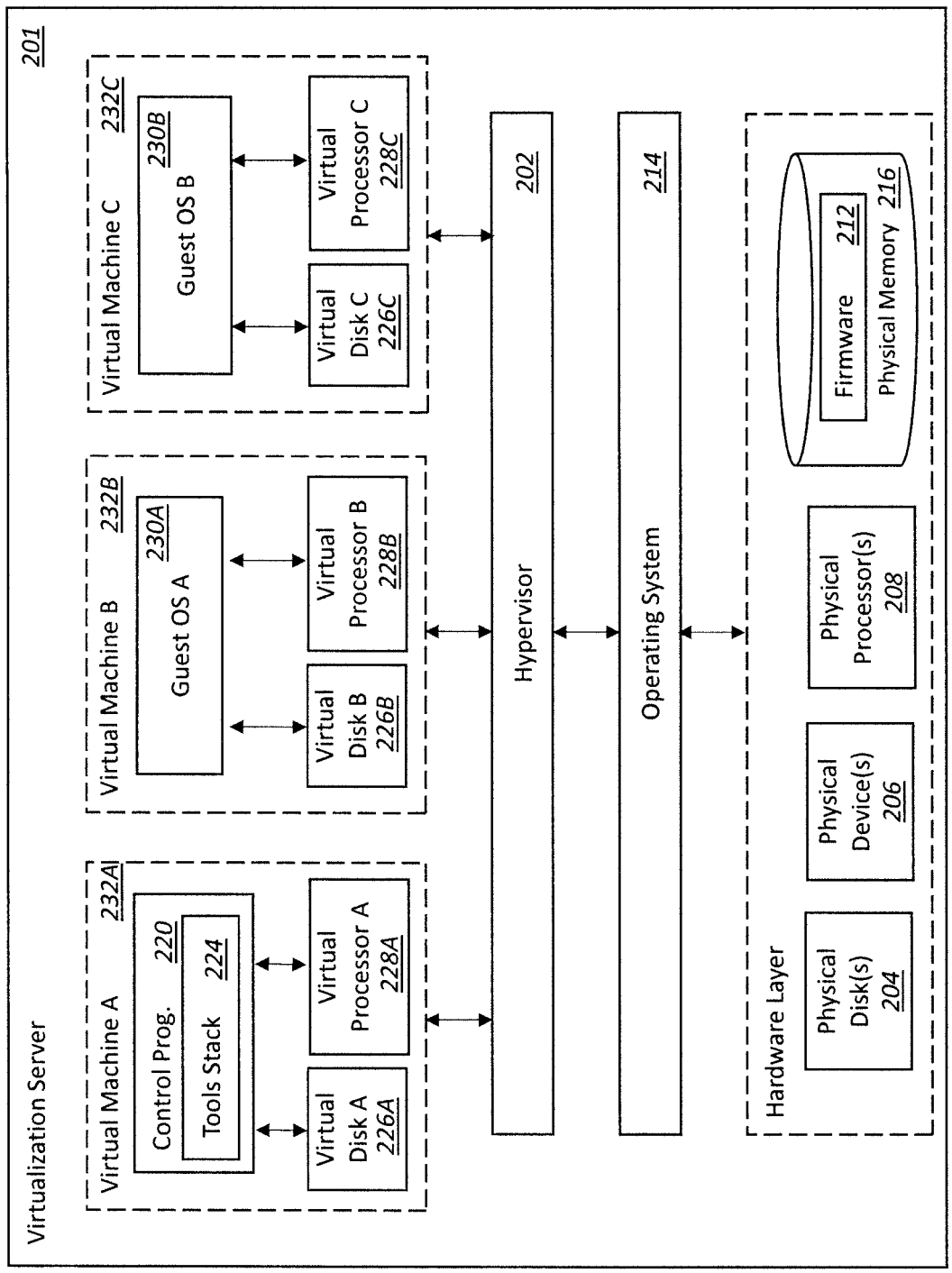
FIG. 2 is a schematic block diagram of an example virtualization server in accordance with one or more illustrative aspects described herein.

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is XEN SERVER provided by Citrix Systems, Inc., of Fort Lauderdale, Fla. Virtual app and desktop sessions may further be provided by XENAPP AND XENDESKTOP, also from Citrix Systems. XENAPP is an application virtualization solution that enhances productivity with universal access to virtual apps, desktops, and data from any device. XENDESKTOP incorporates the same functionality as XenApp, plus the option to implement a scalable VDI solution.

The hypervisor 202 may create one or more virtual machines 232E-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided, and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

Figure 3:
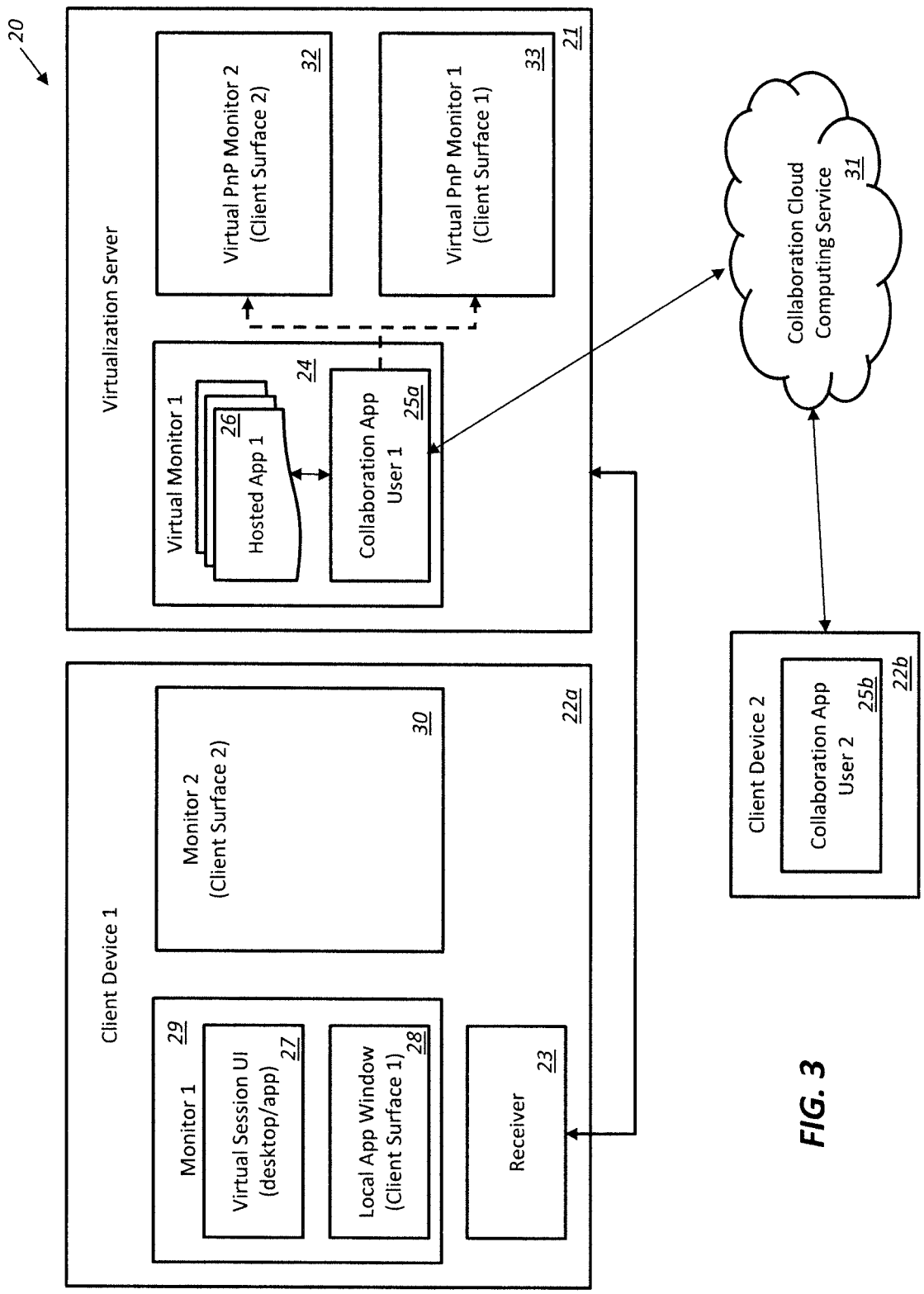
FIG. 3 is a schematic block diagram of a computing system in accordance with an example embodiment providing local graphics surface sharing within a virtual computing session using a virtual plug-and-play (PnP) monitor.
Figure 4:
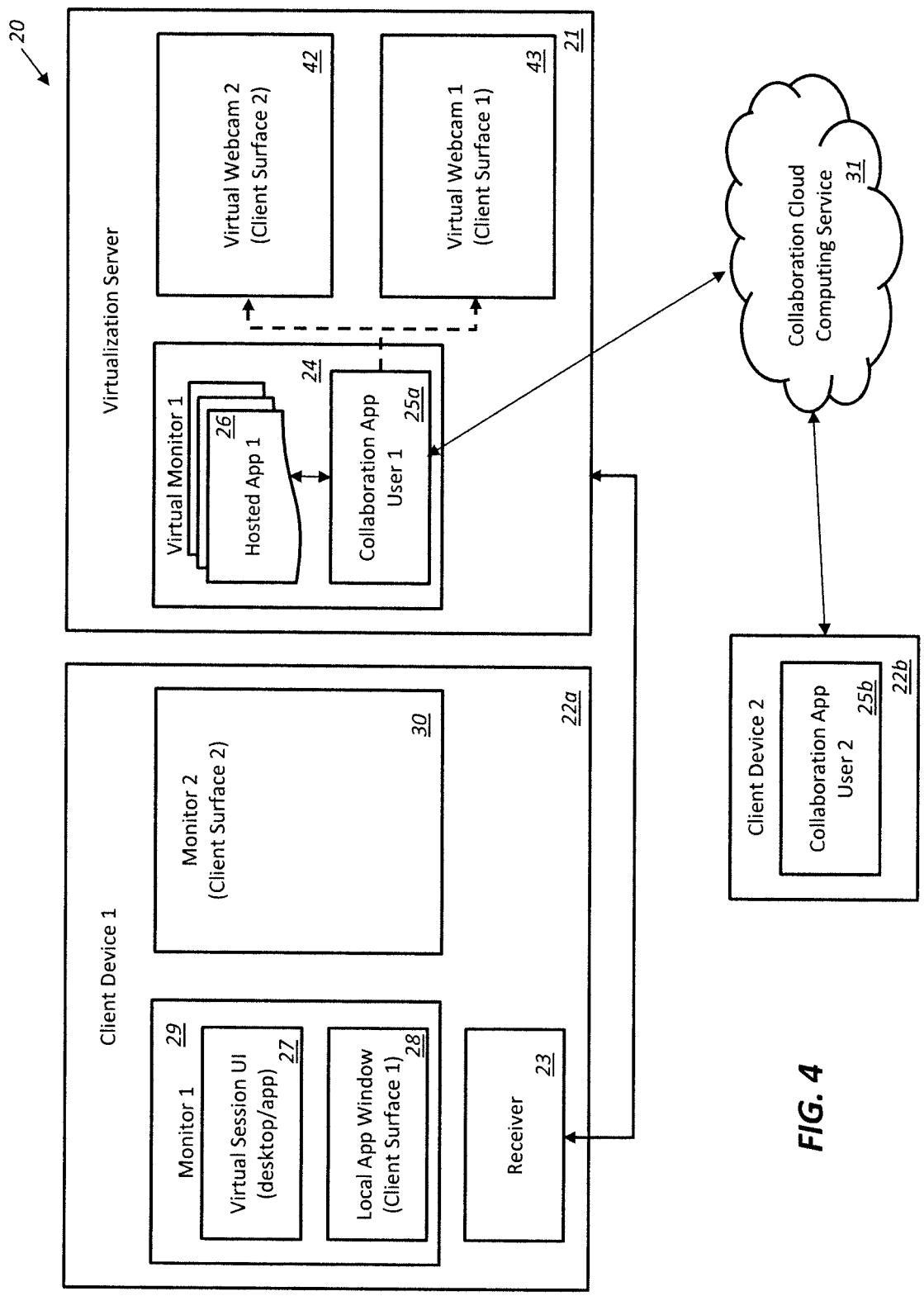
FIG. 4 is a schematic block diagram of a computing system in accordance with another example embodiment providing local graphics surface sharing within a virtual computing session using a virtual webcam.
Figure 5:
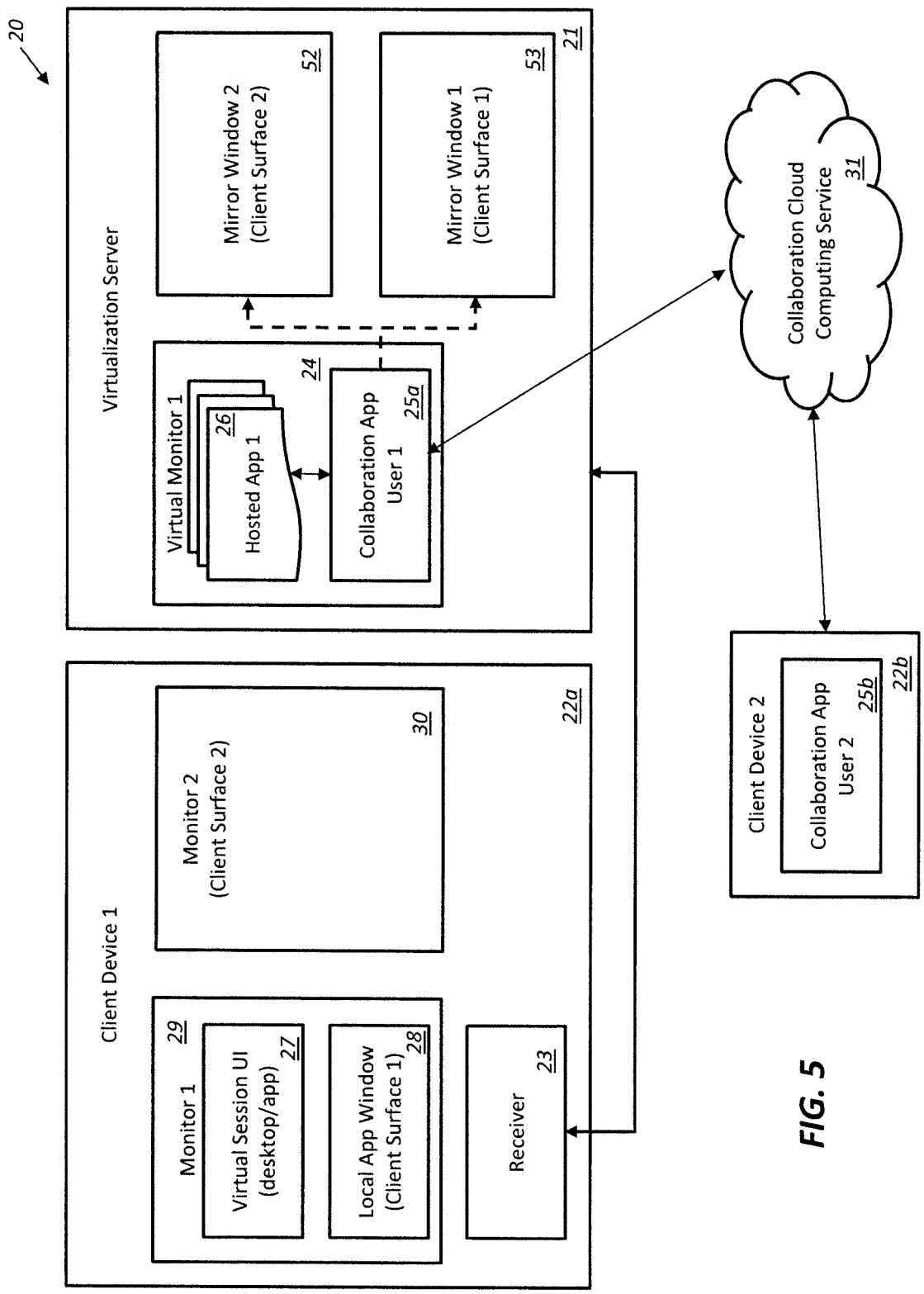
FIG. 5 is a schematic block diagram of a computing system in accordance with still another example embodiment providing local graphics surface sharing within a virtual computing session using a mirror window.
Figure 8:
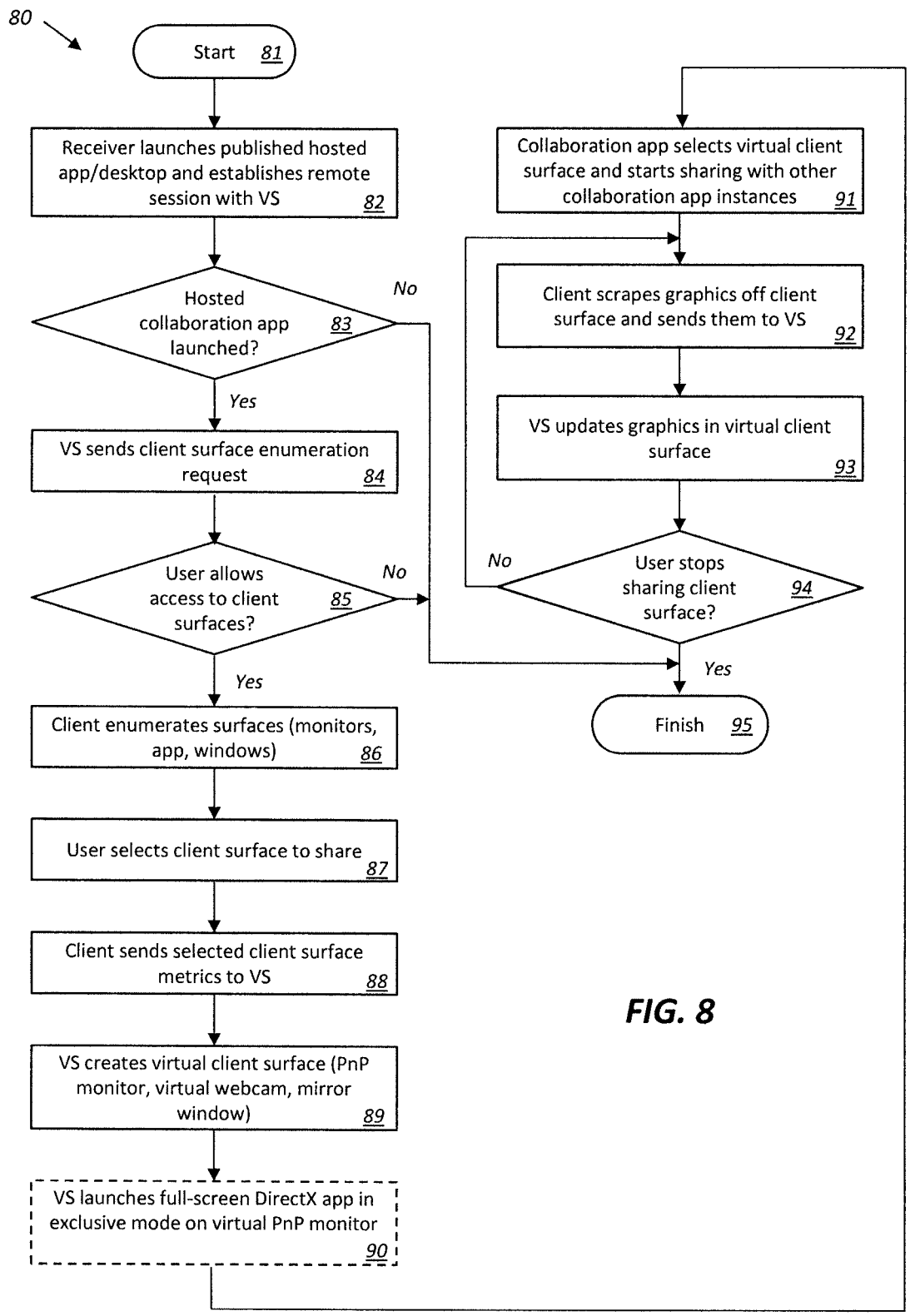
FIG. 8 is a flow diagram illustrating method aspects associated with the systems of FIGS. 3-5.

Turning now to FIGS. 3-5 and the flow diagram 80 of FIG. 8, which begins at Block 81, a computing system 20 which provides for sharing of client device screen content with a collaboration app hosted in a virtual computing session and associated method aspects are first described. The system 20 illustratively includes a virtualization server 21, such as the one described above, which is configured to run various types of virtual sessions for a client device 22a. By way of example, these may be virtual desktop sessions and/or virtual application sessions hosted via XENDESKTOP and/or XENAPP as discussed further above. It should be noted that while a single virtualization server 21 is shown in the illustrated example, more than one such server may be used in some embodiments to provide a distributed virtualization environment, if desired.

By way of background, collaboration apps like GoToMeeting (GTM) or Skype for Business (SFB of SKYPE) use screen sharing and have the ability to enumerate monitors/screens or individual app windows during sharing. However, when GTM is run in a remote virtual computing session (e.g., High Definition eXperience (HDX) session using XENDESKTOP or XENAPP from Citrix Systems), the user's endpoint device screen is not visible to GTM. GTM only has the ability to share the hosted desktop or, in the case of published/seamless apps, only the hosted apps that share the same session with GTM. Therefore, this limits the ability of the user to share other apps and content. That is, the user is not able to share with other participants her endpoint device monitors/screens or individual app windows. This may hamper the user interface and provide for a less seamless experience.

Generally speaking, the system 20 advantageously provides for sharing of a client computing device screen content with a collaboration app hosted in a virtual session. In the example illustrated in FIG. 3, the first client computing device 22a participates in a collaboration session with a second client computing device 22b running a local collaboration app 25b (e.g., GTM, WEBEX, SKYPE, etc.). By way of example, the client computing devices 22a, 22b may be desktop computers, laptop computers, tablet computers, mobile computing devices, etc. The first client device 22a runs a virtual server interface (receiver) app 23 that allows access to the virtual computing session running at the virtualization server 21. In accordance with an example implementation, the receiver application 23 may be implemented using CITRIX RECEIVER, client software that provides access to XENDESKTOP and XENAPP installations. Furthermore, the virtual server 21 may be implemented using the Virtual Delivery Agent (VDA) from Citrix Systems. VDA enables connections to applications and desktops, and is installed on the server/machine that runs the XENAPP and/or XENDESKTOP virtual application/desktop sessions for the user. It enables the machines to register with Delivery Controllers and manage the HDX connection to a user device. The following examples will be described with reference to these components, but it will be appreciated that other suitable programs and systems may be used in different embodiments.

In the illustrated example, the receiver 23 launches a published hosted application/desktop and establishes a remote session with the virtual server 21 (Block 82). Here, the hosted app is a desktop session 24 (virtual monitor 1) in which a virtual collaboration app 25a is running (e.g., GTM, WEBEX, SKYPE, etc.) along with one or more hosted applications 26. The desktop session 24 is rendered at the first client device 22a on a first monitor 29 illustratively including a virtual session user interface (UI) 27 (e.g., CITRIX HDX session UI) and a local app window as a first client surface 28 on the first monitor.

However, the first client device 22a also generates its own local graphics surface (client surface 2), here on a second monitor 30. This local graphics surface may include applications (web browser, document processing applications, etc.) installed locally at the client device 22a. It should be noted that both the local and virtual client surfaces may be displayed on a same monitor in different embodiments, i.e., they need not be on multiple monitors in all embodiments. As noted above, with a typical virtual collaboration app, there is no way for the user of the first client device 22a to share this local graphics surface. Yet, in accordance with the present application, once the hosted collaboration app 25a is launched (Block 83), the virtual server 21 may advantageously send a client surface enumeration request to the first client device 22a via the receiver 23, at Block 84. If the user of the first client device 22a allows access to the first and/or second client surfaces (Block 85), the receiver 23 enumerates the client surfaces (which may be a full monitor surface, or smaller surfaces such as an application window, etc.) for sharing during a collaboration session with the second client device 22b, at Block 86.

The user of the first client device 22a may be given the option to select which of the local client surfaces and respective virtual surfaces to share, at Block 87. For the present example, it will be assumed that the user selects both of the illustrated local client surfaces to share during the collaboration session. Accordingly, the first client device 22a sends selected client surface metrics to the virtualization server 21 associated with the local client surface 1 on the first monitor 29 and the local client surface 2 on the second monitor 30, at Block 88. The virtualization server 21 and collaboration app 25a may then emulate the local client surfaces as virtual graphics surfaces to share with other participants in the collaboration session (here the second client device 22b) via a collaboration cloud computing service 31 (e.g., GTM, SKYPE, WEBEX), at Block 89.

In the example of FIG. 3, the virtualization server 21 injects a virtual plug-and-play (PnP) monitor 32 in the hosted session representing a local client surface (client surface 2) from the first client device 22a, at Block 89. The virtualization server 21 further injects a virtual PnP monitor 33 in the hosted session representing a local client surface (client surface 1) from the first client device 22a. By way of example, the virtualization server 21 may use an Indirect Display Driver (IDD) for injecting an additional PnP monitor with arbitrary resolution and position. In accordance with an example implementation, responsive to the enumerated and injected virtual PnP monitors, the virtualization server 21 may optionally launch and present full-screen DirectX Apps in an exclusive mode on the virtual PnP monitor 32 and virtual PnP monitor 33 (Block 90) to prevent other apps from moving to this monitor (e.g., the hosted apps 26 and/or the collaboration app 25a). One potential benefit of using a virtual PnP monitor in a VDA implementation is that it may appear in the VDA Display Settings and be visible to apps such as GTM and SKYPE without further modifications to third party collaboration apps.

In the example of FIG. 4, a different approach is used to virtually emulate the local graphics surfaces of the first client device 22a. Here, the virtualization server 21 in cooperation with the collaboration app 25a creates a virtual webcam 42 in the hosted session representing a local client surface (client surface 2) from the first client device 22a. Furthermore, a virtual webcam 43 may also be created representing a local client surface (client surface 1) from the first client device 22a. By way of example, this approach may leverage the Multimedia (RAVE) Virtual Channel and, in particular, the reverse-RAVE/webcam protocol to emulate an extra virtual webcam representing the local client surface. In the case of a VDA implementation utilizing HDX, HDX already supports virtual webcam redirection. Accordingly, client-side emulation of an on-demand virtual webcam may be added that maps to the selected local client surface. The virtual webcam may be tagged with an appropriate name, e.g., "Receiver Device Screen", if desired. Here again, this approach may be advantageous in that no modifications will be required to existing collaboration apps that support multiple webcams. While the virtual version of the local client surface may be represented with a descriptive webcam name such as "Receiver Device Screen", it would otherwise be indistinguishable from an actual webcam.

In accordance with still another example shown in FIG. 5, virtual emulation of the local client graphics surfaces may be accomplished by creating a mirror window 52 in the hosted session representing a local client surface (client surface 2) from the first client device 22a. Furthermore, a mirror window 53 may also be created representing a local client surface (client surface 1) from the first client device 22a. The mirror windows 52 and 53 may be created in the hosted session on demand to represent the local client surfaces being shared. The mirror windows 52 and 53 may be created by a hosted session system process, e.g. XENAPP WfShell. In Seamless Window mode with hosted apps, the mirror windows 52 and 53 may be ignored by the Seamless Session Agent to prevent the windows from being created as seamless windows on the first client device 22a, i.e., to avoid double-mirroring, for example.

As the collaboration app 25a selects the virtual client surface (whether the virtual PnP monitor 32, the virtual PnP monitor 33, the virtual webcam 42, the virtual webcam 43, the mirror window 52, or the mirror window 53) and starts sharing it with other collaboration app instances (here the collaboration app 25b of the second client device 22b) via the collaboration cloud computing service 31 (Block 91), the receiver 23 scrapes the graphics off of the local client surface (here the local client surface 1 on the first monitor 29 or the local client surface 2 on the second monitor 30) and sends them to the virtualization server 21 (Block 92). In general, the methods for scraping graphics off of local client graphics surface are well understood. For example, for some implementations on Windows OS the following APIs may be used: GDI, DirectX, Windows Media API, Desktop Deduplication API, etc. As another example, for some implementations on Mac OS the following may be used: CGDisplayCapture API, CGDisplayCreateImage API, AVFoundation library, etc. In other implementations, some hardware graphics card-specific methods may be used to for faster results, for example, the NVIDIA Capture SDK. The virtualization server 21 updates the graphics in the virtual client surface (Block 93) until the first client device 22a stops sharing the local client surface (Block 94) (e.g., the collaboration session terminates, the first client device is no longer the presenter, etc.), at which point the virtualization server may also stop generating the virtual client surface. The method of FIG. 8 illustratively concludes at Block 95.

The virtualization server 21 may scrape and remote either an entire client monitor or a specific local app window graphics. By way of example, for mobile platforms like iOS the receiver 23 may coexist with another mobile app in a split view. Alternatively, the receiver 23 may run in the background as a multimedia app, although this may cause the user to lose view of the remote session (e.g., an HDX session). To scrape the contents of a mobile app, elements of the CITRIX HDX Concierge technology may be used in some implementations. In other implementations elements of the CITRIX Mobile Device eXperience (MDX) technology may be used. In particular, a MDX framework may be used to reside inside the mobile app and request the top view of the app window to redraw itself into a new off-screen context. The aforementioned request may also redraw all the application window sub-views into the off-screen context. Furthermore, the MDX framework may convert the data from the off-screen context into an image format such as JPEG, DIB, etc. Furthermore, the MDX framework may keep repeating this process and analyze the differences between a new and previous local client surface capture in order to optimize the generation of updates from the local client surface to be sent to the virtualization server 21. Another advantage of a split view is that both apps will efficiently utilize CPU resources. The client-to-host graphics remoting may be implemented as a stream over a graphics Virtual Channel such as the CITRIX HDX Thinwire Virtual Channel by introducing a client-to-host protocol for graphics remoting. Another approach is a multimedia Virtual Channel such as the CITRIX HDX multimedia (RAVE) Virtual Channel, in which elements of the existing reverse-RAVE/ Webcam support protocol may be leveraged to stream graphics as video. The video may be streamed in H.264 encoding.

As another embodiment, screens from client-paired devices may also be shared. For example, the screen contents of a monitor used by a CITRIX Workspace Hub (WSH) running on a Raspberry Pi may be shared with a paired device (e.g., iPad or Windows OS devices) that runs the receiver 23 (e.g., CITRIX RECEIVER). For security, privacy and user experience (UX) reasons, users may be prompted for access to their local device screens and offered a selection of all monitors, a specific monitor, specific app windows, or mobile app, etc. to be remoted, as noted above.

In some implementations, optimized monitor emulation may be provided. More particularly, for the monitor emulation methods described above (i.e., inject PnP monitor, virtual webcam, and mirror window), to save host system resources at the virtualization server(s) 21, the client monitor emulation may be performed based upon certain conditions. One such condition is an app policy, e.g., configured only for published collaboration apps such as GTM and SKYPE for Business. Another condition is a user-facing UI, e.g., in the case of CITRIX RECEIVER as part of a connection bar, HDX in-session UI, or a shortcut key, to explicitly trigger monitor emulation.

Figure 6:
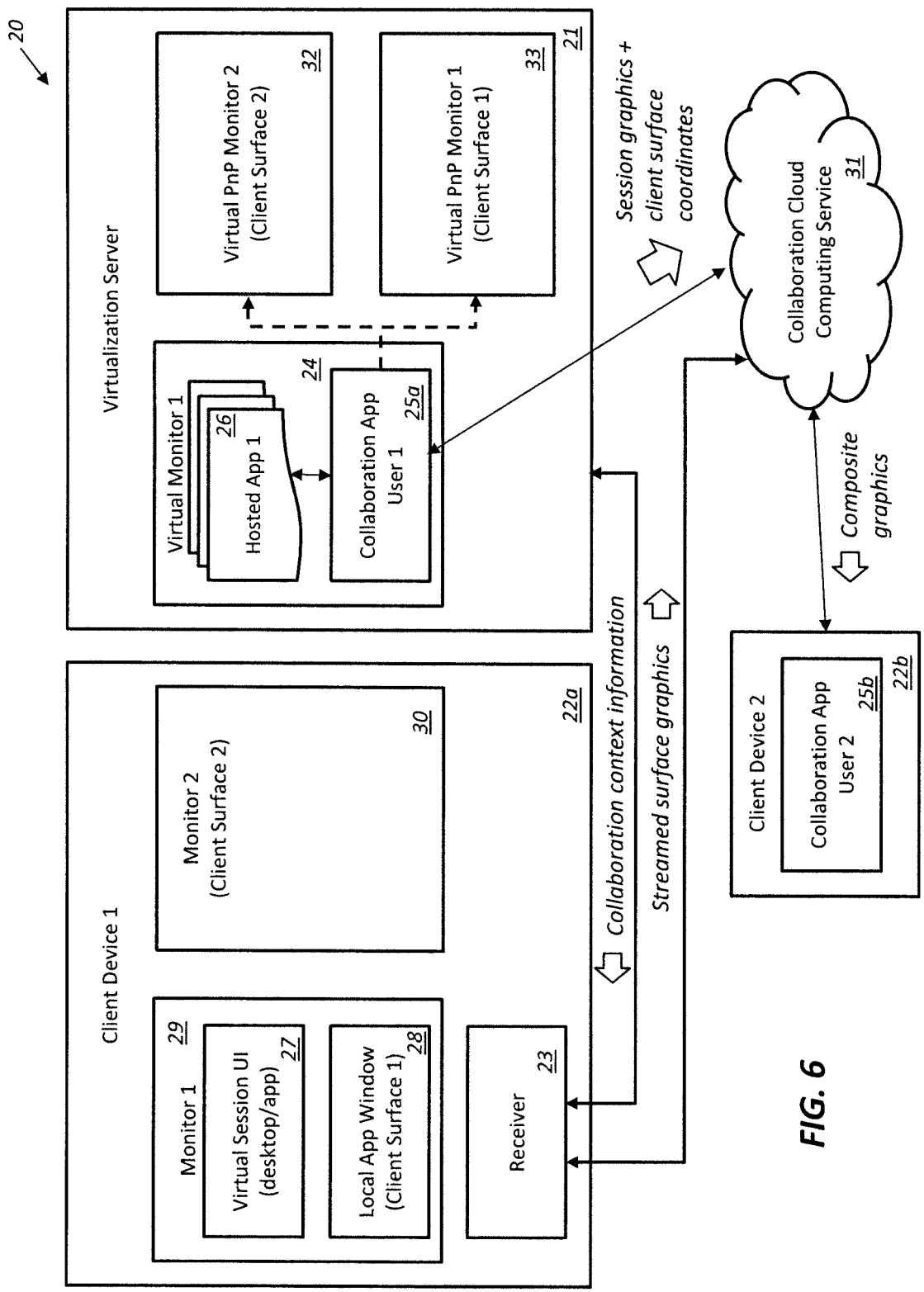
FIG. 6 is a schematic block diagram of a computing system in accordance with another example embodiment providing local graphics surface sharing within a virtual computing session with optimized composite graphics.
Figure 9A:
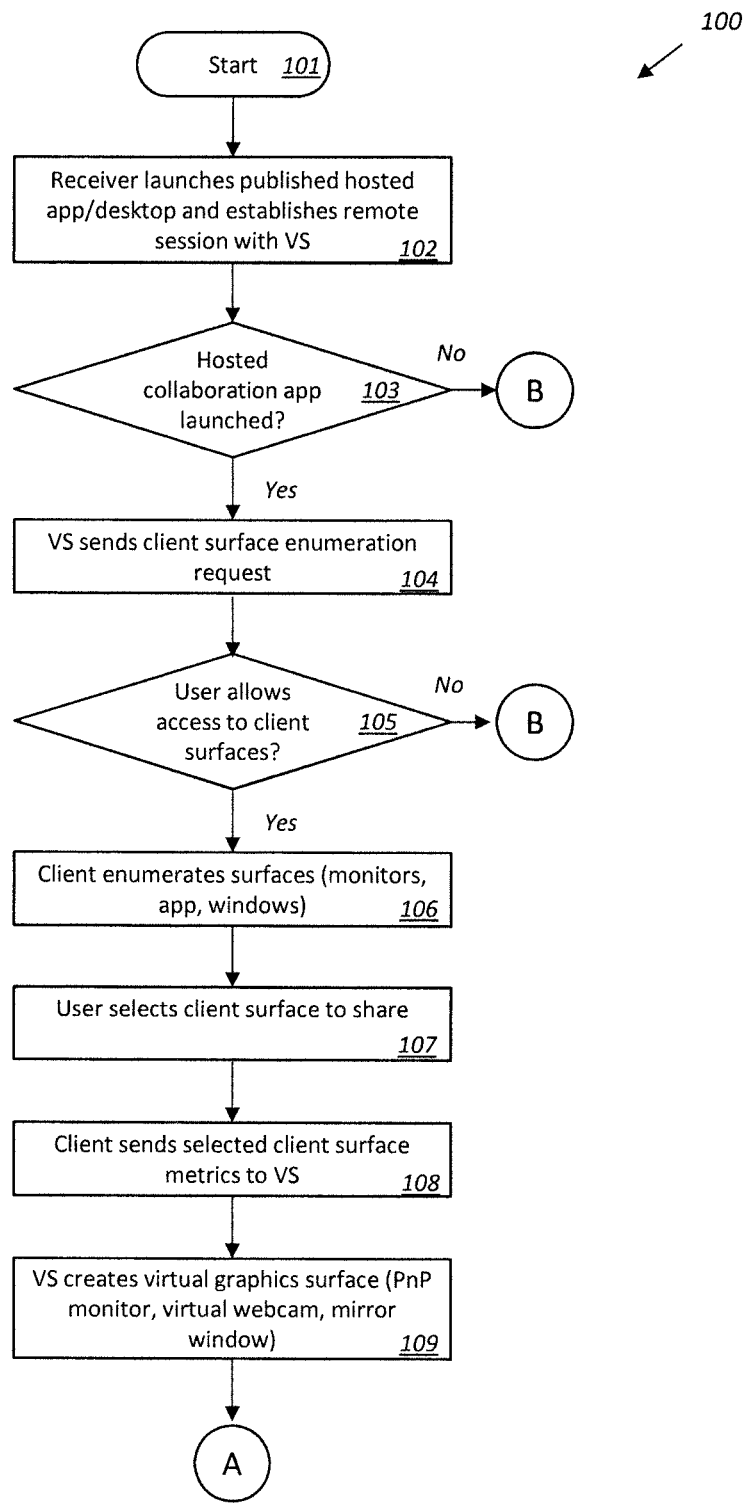
FIGS. 9A, 9B, and 9C are first, second, and third parts of a flow diagram illustrating method aspects associated with the system of FIG. 6.
Figure 9B:
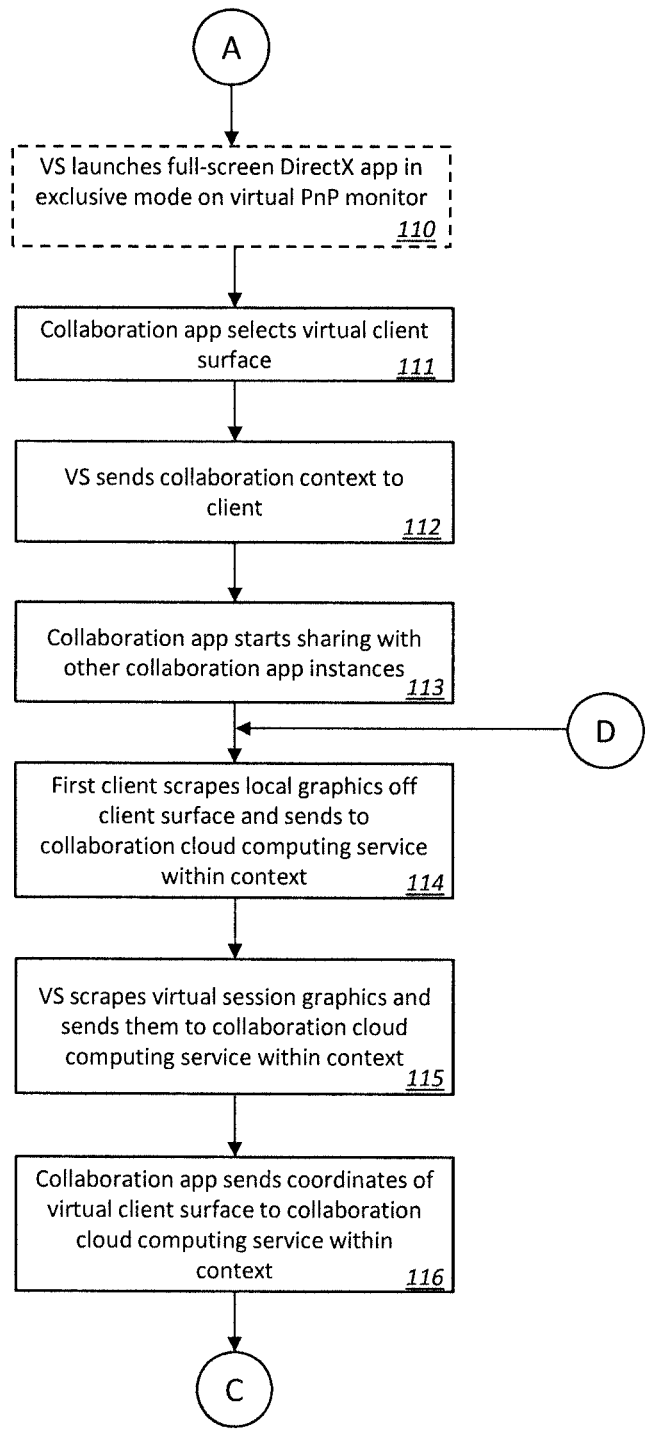
Figure 9C:
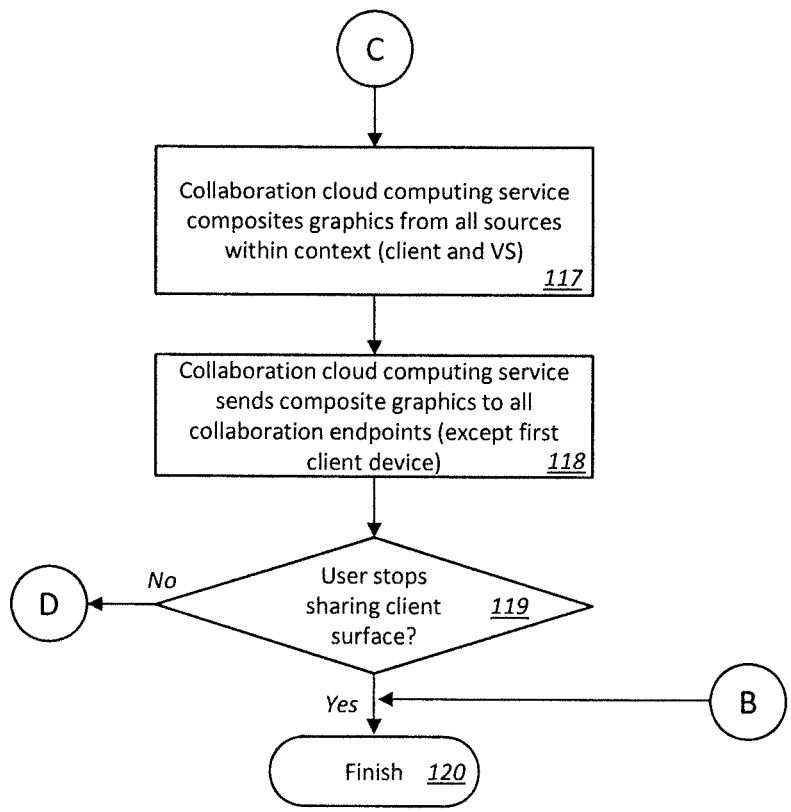

Turning now to FIG. 6 and the flow diagram 100 of FIGS. 9A-9C which begins at Block 101, an approach for providing optimized graphics streaming during a collaboration session involving virtual computing is now described. Generally speaking, this approach may be used to avoid a double hop for shared client graphics via the virtualization server 21 by sending the graphics of the shared client monitor/app window (here the local client surface 1 on the first monitor 29 or the local client surface 2 on the second monitor 30) directly from the first client device 22a to the collaboration cloud computing service 31 (i.e., not via the virtualization server 21 as described above). In the illustrated method, the steps illustrated at Blocks 102-111 are respectively similar to those described above with respect to Blocks 82-91 of FIG. 8. However, rather than directly sharing the virtual client surface (here the virtual PnP monitor 32 or the virtual PnP monitor 33), the collaboration app 25a sends contextual information associated with the collaboration session to the receiver 23 on the client device 22a, at Block 112. By way of example, the contextual information may include a meeting ID, user and authentication tokens, etc. The receiver 23 may then use the contextual information to establish another parallel connection to the collaboration cloud computing service 31 and stream graphics directly to it for sharing with the other collaboration app instances (here the collaboration app 25b), at Block 113.

The second client device 22b is accordingly presented with a combination of virtual session graphics (e.g., HDX session graphics) and local client surface graphics. Therefore, while the receiver 23 scrapes and sends the local graphics from the local client surface 1 on the first monitor 29 or the local client surface 2 on the second monitor 30 to the collaboration cloud computing service 31 (Block 114), the virtualization server 21 may send information to the collaboration cloud computing service about the position, size, resolution, etc., of the "accelerated" graphics to be filled from the parallel client-supplied stream(s), all in session coordinates (i.e., within context) (Block 116). Moreover, the hosted collaboration user app 25a also scrapes or provides the virtual session graphics and the coordinates associated with the virtual client surface(s) (here the virtual PnP monitor 32 or the virtual PnP monitor 33) to the collaboration cloud computing service 31 also within the context of the collaboration session, at Blocks 115-116.

The collaboration cloud computing service 31 may accordingly then merge or composite all of the graphics within the same session context, namely those sent by the host (if any) and those sent by the client (i.e., both of the hosted and local surfaces may be shared at the same time), at Block 117. The combined or composite graphics are then sent from the collaboration cloud computing service 31 to all collaboration app endpoints as normal, but excluding the client device 22a since it does not need to present them, at Block 118. Here the collaboration app 25b is the only other illustrated endpoint in the collaboration session with the first client device 22a, but others may be present as well. As discussed above, the method illustratively concludes when the user of the first client device 22a no longer is sharing the client surface(s), at Blocks 119-120.

Figure 7:
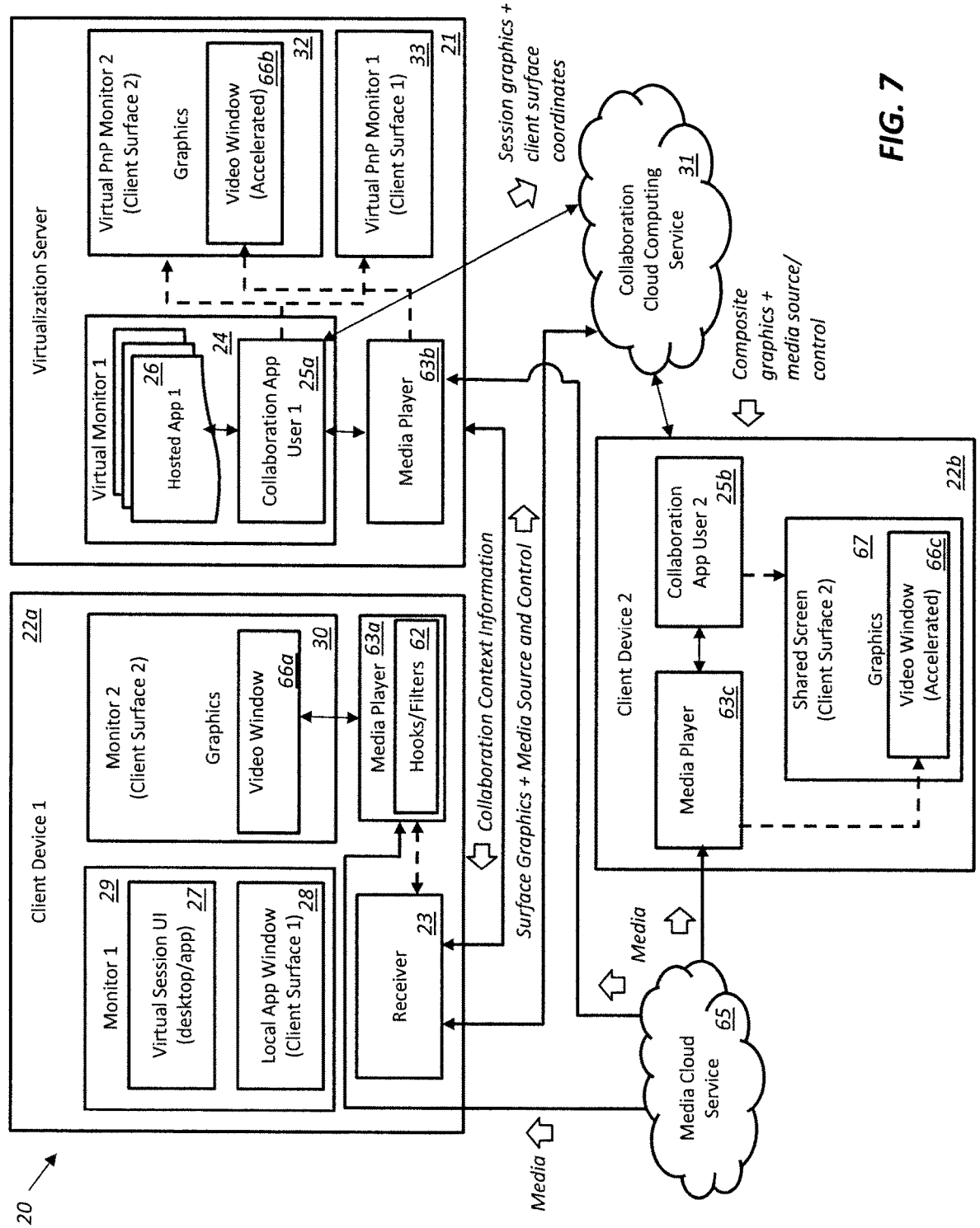
FIG. 7 is a schematic block diagram of a computing system in accordance with yet another example embodiment providing local graphics surface sharing within a virtual computing session with optimized composite graphics and direct video streaming from a media cloud source.

Turning now to FIG. 7, in accordance with another advantageous aspect, the system 20 may also provide for a more efficient sharing of multimedia content playing in a local video window 66a of the first client device 22a (e.g., a YOUTUBE or other video) that is to be streamed to another client device, HDX session, and/or other collaboration endpoints in a collaboration session. Similar to the accelerated graphics optimization described above with reference to FIGS. 6 and 9A-9C, after establishing the collaboration session the collaboration app 25a will send contextual information, such as meeting ID, user and authentication token to the receiver 23 on the first client device 22a. The receiver 23 will then use the contextual information to establish another parallel connection to the collaboration cloud computing service 31. The first client device 22a has "hooks" in the form of shim multimedia filters 62 for a media player 63a. By way of example, the filters 62 may include source, transform and renderer filters. The hooks/filters 62 may be based on DirectShow, DMO, MediaFoundation filters, etc., which intercept Windows Media content. The hooks/filters 62 may also intercept HTML5 video content, as well as Flash content. By way of example, the hooks/filters 62 may be implemented using the above-described CITRIX HDX technology or other suitable programs. This may be done in a similar fashion to existing HDX technology which is capable of intercepting various forms or multimedia content. For further background, see, e.g., U.S. Pat. No. 8,131,816 to Robinson, et al., which is also assigned to the present Applicant and is hereby incorporated herein in its entirety by reference.

In the present example, the hooks/filters 62 need only be used as shim filters for broadcast of multimedia source and control, not for complete multimedia content redirection. When a user on the first client device 22a opens multimedia content in a shared client surface, e.g., video from a YouTube URL, a source filter may intercept the URL, while transform and renderer filters may intercept additional control information such as play, stop, pause, seek commands, video position, video visible region, audio volume and balance, etc. The interception does not alter the natural behavior of the rendering app, e.g., a browser or media player, since the filters are only used as shims, not a replacement of the native filters.

The source URL is then sent from the first client device 22a to the collaboration cloud computing service 31, which sends it to all other collaboration end points. All of the aforementioned control information may also be sent. The virtualization server 21 and the second client device 22b also have their own respective media player agents 63b, 63c, which may be embedded in or controlled by the collaboration app instances 25a, 25b, respectively, to open the source URL (e.g., from YouTube) and apply the control information on the video playback. Thus, the first client device 22a becomes the controller (master), while the other collaboration endpoints become the workers (slaves). The media content is efficiently streamed to all collaboration endpoints from the original source, a media cloud service 65 (e.g. YouTube Cloud Service), without going through the client-virtual server connection or the collaboration cloud computing service 31. A user of the first client device 22a may accordingly efficiently and synchronously control the video/audio playback on all endpoints in a collaboration session. These endpoints include the second client device 22b, the virtual session at the virtualization server 21 (e.g., an HDX session), and optionally other endpoints as well.

Video quality may vary depending on the network properties of the connection between a given collaboration endpoint and the media cloud service 65 (i.e., the source URL provider, such as YouTube Cloud Service). The video playback may be positioned according to the control information sent in shared client surface coordinates as video windows 66b, 66c within rendered shared client surfaces 32, 67, respectively. The rendered shared client surface 32 itself (a virtual PnP monitor in the present example) is positioned as normal in the virtual session coordinates.

In addition, if a media player agent on a worker (slave) endpoint cannot playback the video, e.g. due to lack of suitable codecs, an optional fallback to graphics rendering may occur. More particularly, the first client device 22a always does render the video locally. The graphics streaming from the first client device 22a may always be enabled as described above with respect to FIGS. 3-6. This may include all client surface graphics, namely video and non-video. If video playback at a specific collaboration endpoint successfully initiates, for efficiency the collaboration cloud computing service 31 need not stream graphics to that endpoint in the graphics region overlapped by the video windows such as video windows 66b, 66c, but may instead send an empty (e.g., black) region to the respective collaboration app instance such as collaboration app 25a, 25b. If video playback at a specific collaboration endpoint fails to initiate, all client surface graphics may be streamed to that endpoint instead, as described above with respect to FIGS. 3-6. While this may somewhat degrade the user experience for the video region at the endpoint (e.g., reduced frame rate and/or bitrate of video observed by the user), it still provides for enhanced robustness.

Figure 10:
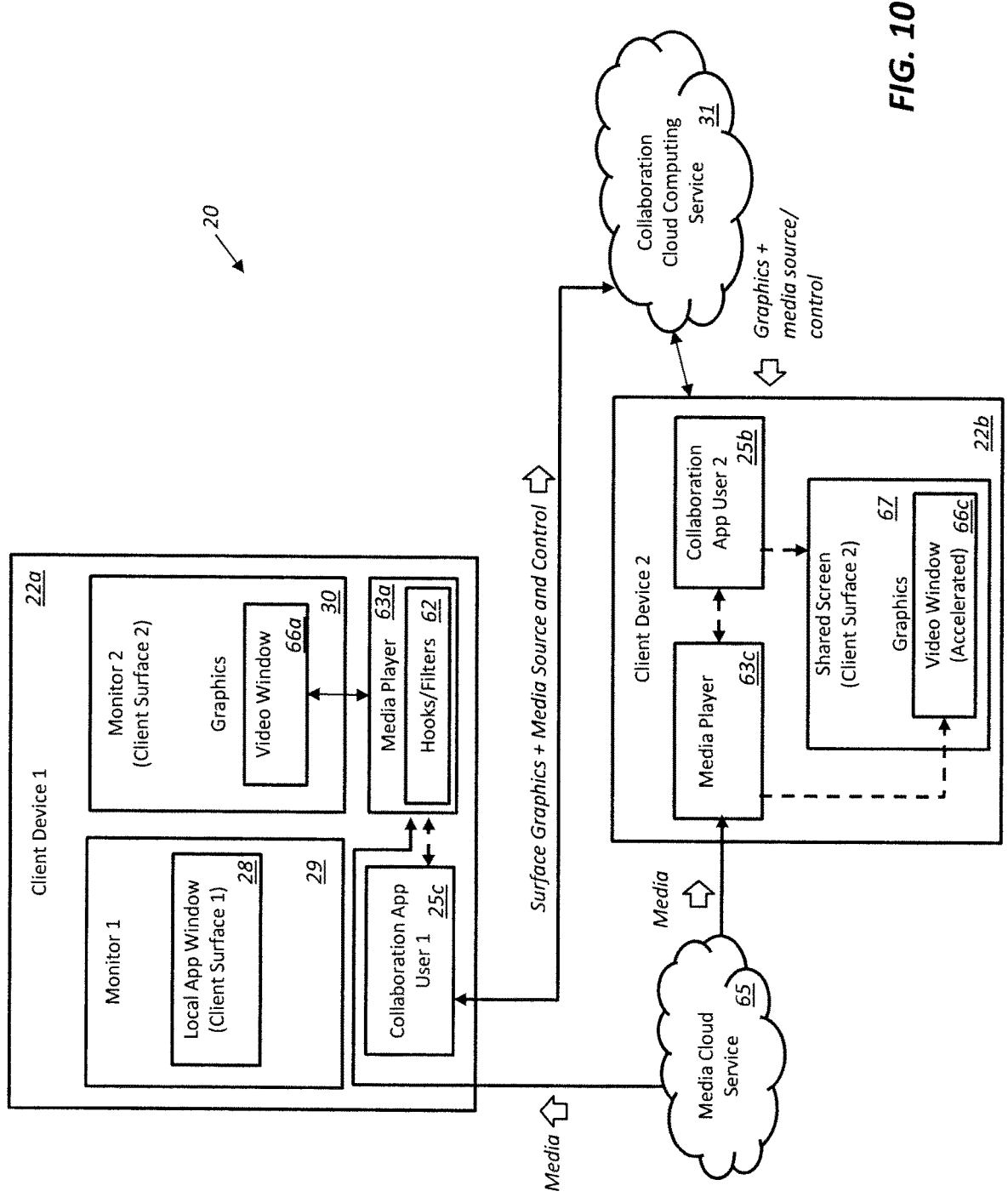
FIG. 10 is a schematic block diagram of a computing system providing direct streaming of video from a media cloud source during a collaborative computing session between multiple endpoints.

Referring additionally to FIG. 10, another similar approach allows for optimized multimedia streaming without a virtualization server (i.e., without any virtual desktop or app sessions). As part of establishing the collaboration session, a client-hosted collaboration app 25c on the first client device 22a is in possession of contextual information, such as meeting ID, user and authentication token, as discussed above. The first client device 22a once again has hooks/filters 62 in the form of shim multimedia filters (e.g., source, transform and renderer filters). As noted above, these hooks 62 may be based on DirectShow, DMO, MediaFoundation filters, etc., which may be used to intercept Windows Media content, HTML5 video content, Flash content, etc. Once again, in the present application the filters need only be used as shim filters for broadcast of multimedia source and control, not for complete multimedia content redirection.

When a user on the first client device 22a opens multimedia content in a video window 66a of a shared client surface (e.g., video in a YouTube URL), the source filter intercepts the URL, while the transform and renderer filters intercept additional control such as play, stop, pause, seek commands, video position, video visible region, audio volume and balance, etc. Once again, the interception need not alter the natural behavior of the rendering app (e.g., a browser or media player), since the filters are only used as shims, not a replacement of the native filters.

The source URL is then sent from the collaboration app 25c on the first client device 22a to the collaboration cloud computing service 31, which sends it to all other collaboration endpoints (here the second client device 22b). The aforementioned control information may also be sent. The second client device 22b has a media player agent 63c which is embedded in or controlled by the collaboration app instance 25b, which opens the source URL (e.g., from YouTube) and applies the control information on the video playback. As described above, the first client device 22a becomes the controller (master), while all other collaboration endpoints become the workers (slaves). The remaining operational aspects may be as described above with reference to FIGS. 9A-9C.

In summary, the above-described embodiments may advantageously provide for sharing of client device screen content with a collaboration app hosted in a virtual session. The methods of screen sharing may include sharing select client surface such as a single monitor or all monitors, a select local app window, seamless window from another session, mobile app running in split view, or an app running on a paired device (such as Citrix Workspace Hub). Monitor emulation may be performed, for example, by: injecting a Plug-and-Play (PnP) virtual monitor with arbitrary resolution and position, consistent with the client surface being shared; creating a virtual webcam in the hosted session representing a client surface; and creating a mirror window in the hosted session representing a client surface.

One or more of the above-described systems may also provide client-to-host graphics streaming for shared client surfaces, as well as optimized graphics streaming by negotiating the sharing of a client surface directly with a collaboration cloud computing service, bypassing the intermediate hop to the collaboration app hosted in the virtual session. Moreover, optimized multimedia streaming may also be achieved through extensions to the collaboration cloud computing service for synchronous streaming of video content (e.g., from YouTube or local client content) to all collaboration endpoints, including client device and CITRIX HDX session, and controlling video playback from the first endpoint device, whether or not a virtual computing session is used.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A computing system comprising:
a first client computing device configured to locally generate a first local graphics surface including a video displayed therein and running at least one multimedia filter;
a second client computing device configured to locally generate a second local graphics surface; and
a collaboration cloud computing service cooperating with the first and second client computing devices to
capture the first graphics surface from the first client computing device without capturing the video displayed therein, and share the captured first graphics surface from the first client computing device within the second graphics surface of the second client computing device,
determine, based upon the at least one multimedia filter running at the first client computing device,
a uniform resource locator (URL) associated with a media cloud source of the video displayed in the first graphics surface using a source filter, and
playback control data associated with the video displayed in the first graphics surface of the first client computing device, and
cause the second client computing device to independently stream the video from the media cloud source based upon the URL, and play the video within the shared first graphics surface synchronously with playback of the video at the first client computing device based upon the playback control data, with the first client computing device being the controller for playback of the video at the second client computing device.

2. The computing system of claim 1 wherein the first client computing device runs a first collaboration application configured to send the URL to the collaboration cloud computing device.

3. The computing system of claim 1 wherein the first client computing device runs a first collaboration application configured to send the playback control data to the collaboration cloud computing device.

4. The computing system of claim 1 wherein the second client computing device runs a second collaboration application, and wherein the collaboration cloud computing service cooperates with the second collaboration application at the second client computing device to share the first local graphics surface within the second local graphics surface of the second client computing device.

5. The computing system of claim 1 wherein the first client computing device is further configured to share with the collaboration cloud computing service a location to display the first graphics surface within the second local graphics surface of the second client computing device.

6. The computing system of claim 1 wherein the playback control data comprises at least one of a play command, stop command, pause command, seek command, video position, video visible region, audio volume, and balance.

7. The computing system of claim 1 wherein the first local graphics surface of the first client computing device comprises at least one of a monitor surface of the first client computing device and a local application window of the first client computing device.

8. A method comprising:
  at a collaboration cloud computing service, capturing a first graphics surface from a first client computing device including a video displayed therein without capturing the video, and sharing the captured first graphics surface from the first client computing device within a second graphics surface of a second client computing device,
  determining, based upon at least one multimedia filter running at the first client computing device, a uniform resource locator (URL) associated with a media cloud source of the video displayed in the first graphics surface using a source filter, and playback control data associated with the video displayed in the first graphics surface of the first client computing device, and
  causing the second client computing device to independently stream the video from the media cloud source based upon the URL and play the video within the shared first graphics surface synchronously with playback of the video at the first client computing device based upon the playback control data, with the first client computing device being the controller for playback of the video at the second client computing device.

9. The method of claim 8 wherein determining further comprises determining the playback control data from a first collaboration application run by the first client computing device.

10. The method of claim 8 wherein causing further comprises cooperating with a second collaboration application run at the second client computing device to share the first local graphics surface within the second local graphics surface of the second client computing device.

11. The method of claim 8 wherein determining the playback control information further comprises cooperating with the first client computing device to determine a location to display the first graphics surface within the second local graphics surface of the second client computing device.

12. A non-transitory computer-readable medium having computer-executable instructions for causing a cloud computing device to perform steps comprising:
  capturing a first graphics surface from a first client computing device including a video displayed therein without capturing the video, and sharing the captured first graphics surface from the first client computing device within a second graphics surface of a second client computing device;
  determining, based upon at least one multimedia filter running at the first client computing device, a uniform resource locator (URL) associated with a media cloud source of the video displayed in the first graphics surface using a source filter, and playback control data associated with the video displayed in the first graphics surface of the first client computing device; and
  causing the second client computing device to independently stream the video from the media cloud source based upon the URL and play the video within the shared first graphics surface synchronously with playback of the video at the first client computing device based upon the playback control data, with the first client computing device being the controller for playback of the video at the second client computing device.

13. The non-transitory computer-readable medium of claim 12 wherein determining further comprises determining the playback control data from a first collaboration application run by the first client computing device.

14. The non-transitory computer-readable medium of claim 12 wherein causing further comprises cooperating with a second collaboration application run at the second client computing device to share the first local graphics surface within the second local graphics surface of the second client computing device.

15. The non-transitory computer-readable medium of claim 12 wherein determining the playback control information further comprises cooperating with the first client computing device to determine a location to display the first graphics surface within the second local graphics surface of the second client computing device.

* * * * *